United States Patent [19]

Wittenrich

[11] 4,176,998

[45] Dec. 4, 1979

[54] FIT-UP TURNING ROLL SYSTEM

[75] Inventor: John H. Wittenrich, Freedom, N.Y.

[73] Assignee: Airco, Inc., Montvale, N.J.

[21] Appl. No.: 878,838

[22] Filed: Feb. 21, 1978

[51] Int. Cl.² .............................................. B65G 7/00
[52] U.S. Cl. .................................................. 414/433
[58] Field of Search ...................... 214/339, 340, 1 Q; 51/236

[56] References Cited

U.S. PATENT DOCUMENTS

| 1,762,427 | 6/1930 | Stiefel ................................. 214/340 |
| 3,228,544 | 6/1966 | Malachowski ....................... 214/340 |

Primary Examiner—Robert G. Sheridan
Attorney, Agent, or Firm—David A. Draegert; E. W. Bopp; Larry R. Cassett

[57] ABSTRACT

A fit-up turning roll system suitable for positioning cylindrical workpieces in alignment with other cylindrical workpieces is described. The workpiece rests upon a number of idler wheels which are mounted for free rotation upon eccentric shafts so that by rotation of the individual shafts, the workpiece is re-positioned.

6 Claims, 2 Drawing Figures

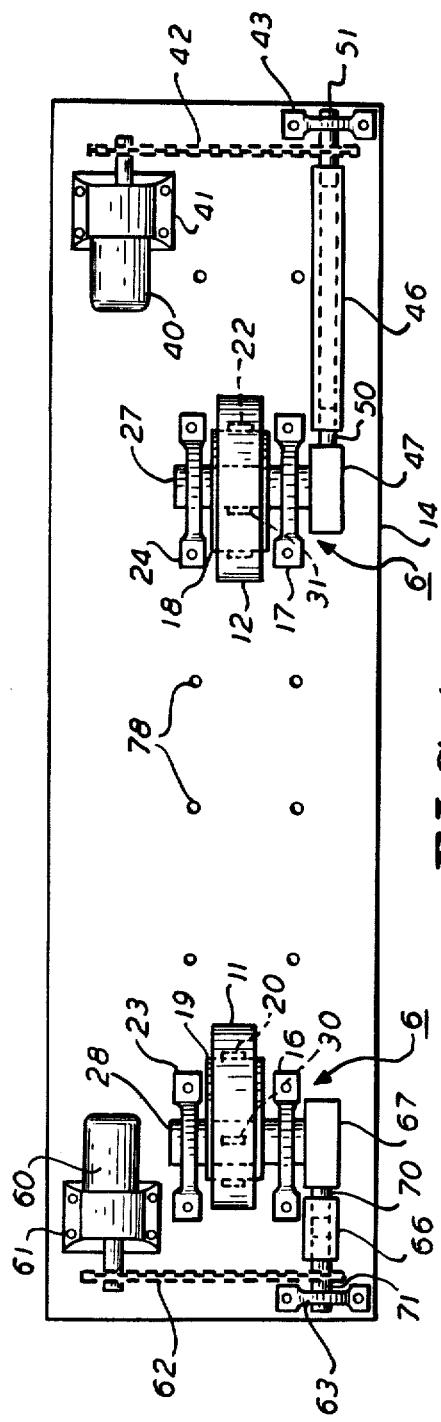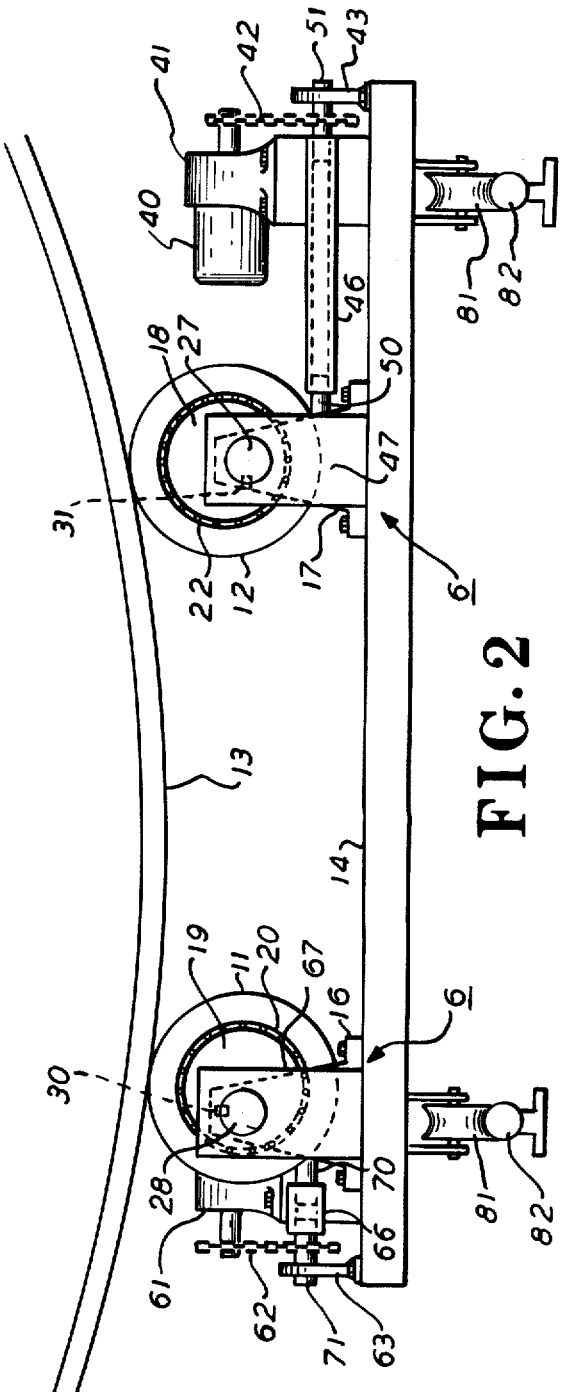

FIT-UP TURNING ROLL SYSTEM

FIELD OF THE INVENTION

This invention relates to the field of positioning workpieces; more particularly, it relates to the positioning, or "fitting-up" of cylindrical workpieces in alignment with other cylindrical workpieces so that the workpieces may be assembled, typically by welding.

BACKGROUND OF THE INVENTION

It is common practice to fabricate large cylindrical vessels or tanks by rolling flat sheets or plates into cylinders, welding the longitudinal seam where the edges of the plates abut, and then joining two or more such cylinders end-to-end by welding the circumferential seam of adjacent cylinders where their respective edges abut. Typically, during the welding operation the cylinders are rested atop a number of axially spaced pairs of wheels having axes parallel to the axis of the cylinder, so that by turning the wheels, by, e.g., an electric motor and suitable control circuitry, the cylinder turns, and the seam between the cylinder sections may be welded with a stationary welding machine, or by a worker operating manual or semi-automatic welding equipment. It will be apparent that moving the work past the weldor at the proper speed will allow him to work far more efficiently than if he is forced to clamber over it. Further, by so doing, the welding operation can always be conducted at a single optimum orientation with respect to the horizontal, so that the parameters of the welding process are uniform throughout the operation. Such powered turning rolls are well-known in the art (See, for example, U.S. Pat. No. 3,448,877 and "Bulletin TR 77," a catalog of such equipment published by the Aronson Machine Co., the employer of the present inventor); a modification to the standard system, in which the workpiece rests upon a resilient belt rather than upon the wheels, for protection of its surface, is shown in U.S. Pat. No. 2,669,364, and on page 14 of the aforementioned catalog. A problem which frequently arises is that the cylindrical sections to be joined together are not exactly the same diameter, or are not perfectly round. In order to fabricate the strongest possible joint, it is clearly advantageous to distribute the total error around the whole circumference of the cylinders, so as to make the average error as small as possible. Thus, if two weldments of nominally 4 meters diameter to be joined differ in diameter by 20 mm., and they are butted together flush at one point, as for example, by resting the ends of the cylinders to be welded upon parallel cylinders or beams bridging the joint, their edges will be 20 mm apart at the opposite point; but by moving one cylinder 10 mm with respect to the other, the error can be limited to 10 mm. As the workpieces are often very heavy, up to one thousand metric tons, it is apparent that there exists a need for powered apparatus whereby such adjustments can be made safely, efficiently and in small increments.

Several types of fit-up rolls have been made to this end in the past. Typically these devices are used in conjunction with powered turning rolls, but are not themselves powered to rotate the cylinders past a stationary welding machine. Rather, one of the cylinders to be joined rests upon powered rolls, the other upon idler rolls adapted to be adjusted so as to position the cylinder. The present invention is of this type as well.

When the two cylinders are brought into alignment, they are "tacked" (i.e. welded together manually at a few points along the seam). Turning one cylinder by means of the powered rolls then, of course, turns the other, and stationary welding equipment, either automatic or manually operated, may be employed to finish-weld the seam.

Two types of fit-up rolls have been made or disclosed in the past. One moves the idler wheels horizontally, toward or away from each other, which has the effect of raising or lowering a supported cylindrical workpiece, or moving it horizontally; alternatively, one or both of the wheels can be moved vertically, thus also raising, lowering, or transferring the cylindrical workpiece; the wheels are moved by powered leadscrews. U.S. Pat. No. 3,514,090 shows a leadscrew system in a different application which is analogous to that used in fit-up idler roll systems.

There are deficiencies inherent in both sorts of leadscrew-powered idler roll systems, including the fact that they are limited to approximately 60 metric tons capacity, due to the excessive power required to raise heavier workpieces by means of leadscrews. As leadscrews are essentially friction devices (i.e., the entire weight of the workpiece rests upon the screws; thus the friction between the screw and its associated nut is directly proportional to the weight of the workpiece) the power requirements are excessive. Moreover, the leadscrews are expensive to manufacture and are not durable in service, again due to the excessive power requirements.

A second type of fit-up idler roll system is disclosed in U.S. Pat. No. 3,480,158. These idler rolls are mounted on pivoted arms, so that their position can be adjusted by actuation of an hydraulic cylinder acting on the arm. This type of system is also limited, by the excessive power required to energize the hydraulic cylinders, to approximately 60 metric tons capacity.

OBJECTS OF THE INVENTION

It is, therefore, an object of the invention to provide an improved fit-up idler roll system for use in positioning cylindrical workpieces.

A more specific object of the invention is to provide fit-up idler roll systems which can be made with essentially unlimited capacity.

Another object of the invention is to provide a fit-up idler roll system at a lower cost, while providing a safer and simpler design, than is available in the prior art.

SUMMARY OF THE INVENTION

The above objects of the invention, and the needs of the art which have been discussed, are satisfied by the present invention, according to which idler wheels are mounted for free rotation upon eccentric shafts; rotation of a shaft by means of an electric motor results in the corresponding wheel being rotated about an axis parallel to but not congruent with its own, thus providing motion of a cylindrical workpiece resting upon the wheel.

BRIEF DESCRIPTION OF THE DRAWINGS

The invention will be more readily understood if reference is made to the drawings, in which FIG. 1 is a plan view and FIG. 2 an elevation of fit-up idler rolls according to the invention.

DESCRIPTION OF THE PREFERRED EMBODIMENT

Referring now to FIGS. 1 and 2, the invention will be described in detail. Where the same parts appear in both Figures, the same reference numerals will be used in both.

In FIG. 2, a fit-up idler roll system according to the invention is shown supporting one end of a cylindrical workpiece 13 upon a pair of idler rolls 11 and 12. The idler rolls 11 and 12 are mounted upon axles 27 and 28, but are not concentric with said axles 27, 28; rather, eccentric sleeves 18 and 19 are provided and are firmly keyed to axles 27, 28 by keys 30 and 31 so that the centers of rolls 11 and 12 are rotated around the centers of axles 27, 28 when the axles are turned.

Rolls 11, 12 are mounted on eccentric sleeves 18 and 19 by means of bearings 20, 22, so that the workpiece 13 may be rotated on them by a powered roller system (not shown), and so that when the axles 27, 28 are rotated to position the workpiece, the rolls 11, 12 can turn freely and need not slide on the workpiece 13.

Typically, the axles 27, 28 are supported by pillow blocks 16, 17 and 23, 24 and are powered for rotation by motors 40 and 60, driving the axles 27, 28 via gear reduction units 41, 61, chains 42, 62, couplings 46, 66 connecting stub axles 51 and 50 and 71 and 70, which are supported by pillow blocks 43 and 63, respectively, and further gear reduction units 47 and 67. By the use of two reduction units per axle, great multiplication of the motor torque can be achieved, thus reducing the size of the motor needed. It has been found that a one-horsepower motor, driving through 29:1 and 36:1 reducers, is more than adequately powerful to position a 10-ton workpiece resting on rolls whose axles have an eccentricity of one-half inch (12.7 mm). Moreover, as the motor's speed is also geared down by the reduction units 41, 61 and 47, 67, an on-off switch is all that is needed for motor control; the rotation of the axles 27, 28 is so slow, on the order of 2 rpm, that elaborate circuitry is not needed to allow incremental adjustment.

Advantageously, at least one of the idler rolls is adapted to be moved, so that the distance between the pair of rolls can be varied, so as to accommodate workpieces of various diameters and to provide rough adjustment of workpiece height. In the embodiment shown in the drawings, this may be done by simply moving one or both assemblies 6 (consisting of a roll 11 or 12, on an axle 27 or 28, a bearing 20 or 22, an eccentric sleeve 18 or 19, pillow blocks 16 and 23 or 17 and 24, and reduction unit 47 or 67) along base 14. Holes 78 are provided for bolting the pillow blocks to the base 14 at the desired location. Coupling 46 or 66 may then simply be replaced with a longer or shorter unit, as desired, and the system is ready for operation; as a matter of practice, a selection of couplings would be provided to the user with the system described. Of course, if it were known that the system of the invention were to be used with only one size of cylinder, it would not be necessary to provide for moving units 6 along base 14.

In operation, the usual practice would be to use two of the systems described (making a total of four individually-adjustable idler rolls) in conjunction with a set of powered rolls. One workpiece would be set upon the powered rolls, and the second upon the system of the invention. By individually energizing the motors 40 and 60 and those on the second pair of fit-up rolls, the second workpiece can be aligned with, or fit-up with, the first, and tack welds may be made at several points along the seam. Since the eccentricity provided for adjustment is small compared to the center spacing of axles 27 and 28, it is essential that the powered roll system have the same center spacing, so that only small adjustments are required; therefore, the powered roll unit and the idler roll system of the invention must be designed to match one another. The powered rollers may then be energized; the cylinder will turn on the idler rolls, and the seam may be welded firmly by means of stationary welding equipment.

In some cases it may be desirable to mount the idler roll system of the invention and the corresponding powered rolls upon tracks, set into the floor of the workshop, so that the rolls may be conveniently positioned. This may be done simply and conveniently as shown in FIG. 2, by simply mounting the frame 14 on casters 81 adapted to fit rails 82. The casters might be powered for driving the system along the rails. Alternatively, of course, the frame 14 can simply be set on the floor.

Another alternate embodiment of the system of the invention would be to adapt the rolls to use the resilient belt arrangement mentioned above with reference to U.S. Pat. No. 2,669,364.

It will be apparent that the system of the invention is safer than those in the prior art, particularly that shown in U.S. Pat. No. 3,480,158. There, failure of the locating means could permit the workpiece to roll off the rolls with dangerous results. Failure of any part of the location mechanism of the present invention, by comparison, will only allow one of the eccentric wheels to pivot about its axle until the wheel is at its lowest point; this point being rather close to its highest point, the workpiece will not be likely to build up sufficient kinetic energy to escape from between the rolls. It will also be apparent that the system of the invention is simpler and less expensive than those in the prior art. Too, the present invention is vastly more conservative of power than those described above, particularly because it is designed to provide only a small range of adjustment, whereas the systems in the prior art are meant to provide a much larger range; this leads to excessive power requirements.

Finally, it will be appreciated that the invention as described above can readily be modified by those skilled in the art, so that this description should be considered as exemplary only; the invention is more properly defined by the claims appended hereto.

I claim as my invention:

1. In apparatus for positioning a first substantially cylindrical workpiece in alignment with a second workpiece, comprising: a base, at least two substantially parallel idler rolls and corresponding shafts being mounted upon the base for supporting said first workpiece, the improvement which comprises means for mounting each roll for free rotation about an eccentric axis of the corresponding shaft, and motor means for individually rotating each said shaft to cause the axis of the corresponding roll to be rotated about the axis of the shaft to enable horizontal and vertical repositioning of said first workpiece.

2. Apparatus as defined in claim 1, wherein each roll is mounted to the base by means of individual mounting structure, which structure is adapted to be moved along the base, varying the distance between the shafts, so that cylindrical workpieces of varying diameters can be securely accommodated upon the idler rolls, thus providing for rough adjustment of the position of a given workpiece, fine adjustment being provided by eccentric rotation of the axes of the idler rolls.

3. Apparatus according to claim 1, wherein the shafts upon which the idler rolls are mounted are made eccentric by providing eccentric keyed sleeves upon which the rolls are mounted for free rotation.

4. Apparatus for supporting a first substantially cylindrical workpiece for rotation upon a plurality of work-supporting idler rolls, and for positioning of the workpiece in alignment with a second workpiece, for the joining together of the workpieces by welding, comprising:
   a base; and
   at least two assemblies, each comprising a motor adapted to drive a shaft having at least one eccentric journal thereon and an idler roll mounted for free rotation on each eccentric journal, the axes of said shafts being substantially parallel to one another and to the axis of said first workpiece, whereby fine adjustments in the positioning of said first workpiece may be effected by individually-controlled rotation of the shafts to rotate the axes of the rolls about the axes of the shafts.

5. Apparatus according to claim 4, wherein the assemblies are adapted to be moved along the base, so that rough adjustment in the position of said first workpiece may be effected by varying the distance between the shafts.

6. Apparatus according to claim 4 wherein the shafts are cylinders having eccentric sleeves firmly mounted thereon, the sleeves being so adapted that the rolls can be mounted for free rotation thereupon.

* * * * *